United States Patent
Yampolsky et al.

(10) Patent No.: US 12,113,890 B2
(45) Date of Patent: Oct. 8, 2024

(54) HOMOMORPHIC ENCRYPTION USING SMART CONTRACTS

(71) Applicant: NEC Corporation Of America, Herzlia (IL)

(72) Inventors: Ori Yampolsky, Herzliya (IL); Tsvi Lev, Tel-Aviv (IL); Yaacov Hoch, Ramat-Gan (IL)

(73) Assignee: NEC Corporation Of America, Herzlia (IL)

( * ) Notice: Subject to any disclaimer, the term of this patent is extended or adjusted under 35 U.S.C. 154(b) by 201 days.

(21) Appl. No.: 17/849,837

(22) Filed: Jun. 27, 2022

(65) Prior Publication Data

US 2023/0421351 A1    Dec. 28, 2023

(51) Int. Cl.
*H04L 9/32*    (2006.01)
*H04L 9/00*    (2022.01)

(52) U.S. Cl.
CPC ............ *H04L 9/008* (2013.01); *H04L 9/3218* (2013.01)

(58) Field of Classification Search
CPC .............................. H04L 9/008; H04L 9/3218
See application file for complete search history.

(56) References Cited

U.S. PATENT DOCUMENTS

| | | | |
|---|---|---|---|
| 2019/0026146 A1* | 1/2019 | Peffers | G06F 9/5044 |
| 2019/0303623 A1* | 10/2019 | Reddy | G06F 8/71 |
| 2020/0195437 A1* | 6/2020 | Gallagher | G06Q 30/08 |
| 2021/0203475 A1* | 7/2021 | Xiao | H04L 9/50 |
| 2022/0045840 A1* | 2/2022 | Honorio Araujo da Silva | H04L 9/3033 |
| 2022/0368545 A1* | 11/2022 | Han | H04L 9/50 |
| 2023/0208638 A1* | 6/2023 | Manevich | H04L 9/3247 713/171 |

FOREIGN PATENT DOCUMENTS

KR    2471210 B1 * 11/2022

OTHER PUBLICATIONS

Van Dijk et al. "Fully Homomorphic Encryption Over the Integers", EUROCRYPT'10: Proceedings of the 29th Annual International Conference on Theory and Applications of Cryptographic Techniques, French Riviera, France, May 30-Jun. 3, 2010, p. 24-43, May 30, 2010.

* cited by examiner

*Primary Examiner* — Badrinarayanan Champakesan (57) ABSTRACT

There is provided a system of cryptography for securing data on a blockchain, comprising: at least one hardware processor executing a code for: obtaining at least one encrypted data item, encrypted with a public key compliant with a homomorphic encryption mechanism, feeding the at least one encrypted data item into a computational process that computationally processes the at least one encrypted data item with computations compliant with the homomorphic encryption mechanism, and providing at least one encrypted outcome of the computational process to a smart contract for posting on a blockchain, wherein the at least one encrypted outcome is compliant with the homomorphic encryption mechanism and decrypted with a private key corresponding to the public key.

8 Claims, 3 Drawing Sheets

HOMOMORPHIC ENCRYPTION USING SMART CONTRACTS

FIELD AND BACKGROUND OF THE INVENTION

The present invention, in some embodiments thereof, relates to smart contracts executed within a blockchain and, more specifically, but not exclusively, to encryption of data in association with smart contracts.

Smart contracts are computations that take place on a blockchain. Data is stored on the blockchain using cryptographically signed transactions. Smart contracts provide non-centralized, secure computations, since execution is controlled by the blockchain, and the data stored on the blockchain is publicly accessible.

SUMMARY OF THE INVENTION

According to a first aspect, a system of cryptography for securing data on a blockchain, comprises: at least one hardware processor executing a code for: obtaining at least one encrypted data item, encrypted with a public key compliant with a homomorphic encryption mechanism, feeding the at least one encrypted data item into a computational process that computationally processes the at least one encrypted data item with computations compliant with the homomorphic encryption mechanism, and providing at least one encrypted outcome of the computational process to a smart contract for posting on a blockchain, wherein the at least one encrypted outcome is compliant with the homomorphic encryption mechanism and decrypted with a private key corresponding to the public key.

According to a second aspect, a method of cryptography for securing data on a blockchain, comprises: using at least one hardware processor executing a code for: obtaining at least one encrypted data item, encrypted with a public key compliant with a homomorphic encryption mechanism, feeding the at least one encrypted data item into a computational process that computationally processes the at least one encrypted data item with computations compliant with the homomorphic encryption mechanism, and providing at least one encrypted outcome of the computational process to a smart contract for posting on a blockchain, wherein the at least one encrypted outcome is compliant with the homomorphic encryption mechanism and decrypted with a private key corresponding to the public key.

According to a third aspect, a non-transitory medium stores program instructions for securing data on a blockchain, which, when executed by at least one processor, cause the at least one processor to: obtain at least one encrypted data item, encrypted with a public key compliant with a homomorphic encryption mechanism, feed the at least one encrypted data item into a computational process that computationally processes the at least one encrypted data item with computations compliant with the homomorphic encryption mechanism, and provide at least one encrypted outcome of the computational process to a smart contract for posting on a blockchain, wherein the at least one encrypted outcome is compliant with the homomorphic encryption mechanism and decrypted with a private key corresponding to the public key.

In a further implementation form of the first, second, and third aspects, the computational process is executed by at least one processor of a network connected offload server that executes the computational process off the blockchain, and is in network communication with network nodes hosting the blockchain and the smart contract.

In a further implementation form of the first, second, and third aspects, feeding the at least one encrypted data comprises feeding the at least one encrypted data into a plurality of computational processes executed by a plurality of off-loading smart contracts executing on a plurality of off-loading servers, wherein the at least one encrypted outcome is obtained as an aggregation of sub-outcomes obtained from the plurality of off-loading smart contracts.

In a further implementation form of the first, second, and third aspects, further comprising code that when executed by a processor of a client terminal, causes the processor to: generate a pair including a private key and a public key, compliant with the homomorphic encryption mechanism, encrypt at least one data item with the public key to generate the at least one encrypted data item, and provide the at least one encrypted data item for feeding into the computational process.

In a further implementation form of the first, second, and third aspects, further comprising code that when executed by a processor of a client terminal, causes the processor to: access the blockchain to obtain the at least one encrypted outcome, and decrypt the at least one encrypted outcome with the private key to obtain at least one decrypted outcome.

In a further implementation form of the first, second, and third aspects, further comprising code for obtaining a zero knowledge proof from the computational process, and providing the zero knowledge proof to the smart contract for storing on the blockchain.

In a further implementation form of the first, second, and third aspects, the at least one encrypted data item is obtained from a client terminal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to smart contracts executed within a blockchain and, more specifically, but not exclusively, to encryption of data in association with smart contracts.

An aspect of some embodiments of the present invention relates to systems, methods, computing device, and/or code instructions (stored on a memory and executable by one or more processors) for securing data on a blockchain by encryption. One or more encrypted data item are provided. The encrypted data items are encrypted with a public key compliant with a homomorphic encryption mechanism. The encrypted data item is fed into a computational process that computationally processes the encrypted data item with computations compliant with the homomorphic encryption mechanism, off the blockchain. Optionally, an interface offloads the homomorphic computations from the blockchain to an offload server (also referred to as layer 2 (L2) offloading. The homomorphic encryption mechanism enables the encrypted data to be processed in its encrypted form. One or more encrypted outcomes of the computational processes are provided to a smart contract for posting on a blockchain. The encrypted outcome, which is compliant with the homomorphic encryption mechanism, may be stored in a blockchain block, providing a publicly accessible record, that is immutable. Entities (e.g., client terminals) with a private key corresponding to the public key and compliant with the homomorphic encryption are able to decrypt the encrypted outcome.

At least some implementations described herein address the technical problem of preserving privacy using smart contracts and/or blockchains, i.e., using the smart contracts and/or blockchains for processing and/or storing confidential data. Smart contracts and/or blockchains are inherently public, as all data stored on the blockchain and/or computed by the smart contract is available to anyone, for example, for validation. Privacy is not maintained by smart contracts and/or blockchains. Efforts to introduce encryption into smart contracts and/or blockchains has been hampered by the required processing resources, and/or processing time to process encrypted data.

At least some implementations described herein improve the technology of smart contracts and/or blockchains, by enabling using smart contracts and/or blockchains for processing and/or storing confidential data. In particular, enabling smart contacts and/or blockchains to work with encrypted data.

At least some implementations described herein improve upon prior approaches of using smart contracts and/or blockchains for processing and/or storing confidential data. Processing encrypted data on the blockchain ties up the limited available processing resources, and therefore cannot be practically implemented using standard approaches. In order to preserve privacy, solutions based on multi-party computation (MPC) approaches are used. However, such MPC based approaches are different than processing homomorphic encrypted data. MPC based approaches do not work with encrypted data. MPC based approaches run on multiple servers to perform the calculations. Security of the data is based on separation of the data between the different computers such that no single computer has all of the data. Moreover, communication between the multiple computers should be private to help protect the data. Access to all computers enables obtaining the complete data. In MPC based approaches the result of the computation is divided between the different computers. The real result is obtained from the multiple computers. As such, the result cannot be stored on a public blockchain in a secure manner, since the result is not encrypted. Similarly, since the intermediate computational stages performed by the different computers to obtain the result are unencrypted, the values obtained during the intermediate stages should not be shared or otherwise made public. However, since MPC based approaches are not computationally intensive, they may be executed by the smart contract running on the blockchain. In contrast, in embodiments described herein that utilize homomorphic encryption, the encryption of the data is not dependent on the exposure but only on the possession of the encryption key. The intermediate data during computation and outcome of computation are maintained in the encrypted state. The homomorphic encryption enables performing computations on the data in the encrypted state. Security is dependent on the encryption key and not on retaining the intermediate states secret. As such, the actual result, which is encrypted using the homomorphic encryption mechanism, may be stored on the blockchain where it is publicly available, while maintaining security of the data (since only entities with the private key can decrypt the data). However, since homomorphic encryption involves working with very large numbers and/or complex computations, smart contracts executing on the blockchain cannot practically process homomorphic encrypted data.

At least some embodiments described herein enable smart contracts executing on a blockchain to work with homomorphic encrypted data, which is traditionally seen as impossible/impractical due to the nature of smart contracts and/or blockchains that are unable to work with computationally intensive processes such as computations on homomorphic encrypted data.

The solution to the above mentioned technical problem, and/or the improvement to the above mentioned technology, and/or improvement over prior approaches, is based on using a computation process located off-blockchain to perform computations on data encrypted with a homomorphic encryption mechanism, to obtain an encrypted outcome. For example, homomorphic encryption is used to encrypt input data. The encrypted input data layer 2 (L2) offloaded to an offload server, which computes an encrypted outcome. The processing of encrypted data is offloaded from the node hosting the smart contract and/or blockchain, to the processors of the offload server, improving computational efficiency of the node hosting the smart contract and/or blockchain. The off-loading of the computations from the blockchain to the offload server enables processing of very large numbers, which are used in homomorphic encryption. The encrypted outcome is documented on the blockchain, providing a public record, that is immutable, while protecting the confidentiality of the data. Any calculation may be performed on any offload server, with the encrypted result stored on the blockchain. Even though entities have may be able to access the data during computations performed by the offload server, and/or access the outcome of the computations, since the data and outcome are encrypted by homomorphic encryption, the entities cannot use the data and/or infer anything about the data, such as the inputs, intermediate values, and/or outputs. Only those entities with the key able to decrypt the data are able to obtain the decrypted results.

At least some implementations described herein implement homomorphic encryption using L2 offloading of smart contracts. This allows the computation of a desired function using the underlying smart contracts while preserving the privacy as intermediate values are encrypted. As individual smart contracts cannot handle the complexity of the required operation the implementation are divided across several contracts.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
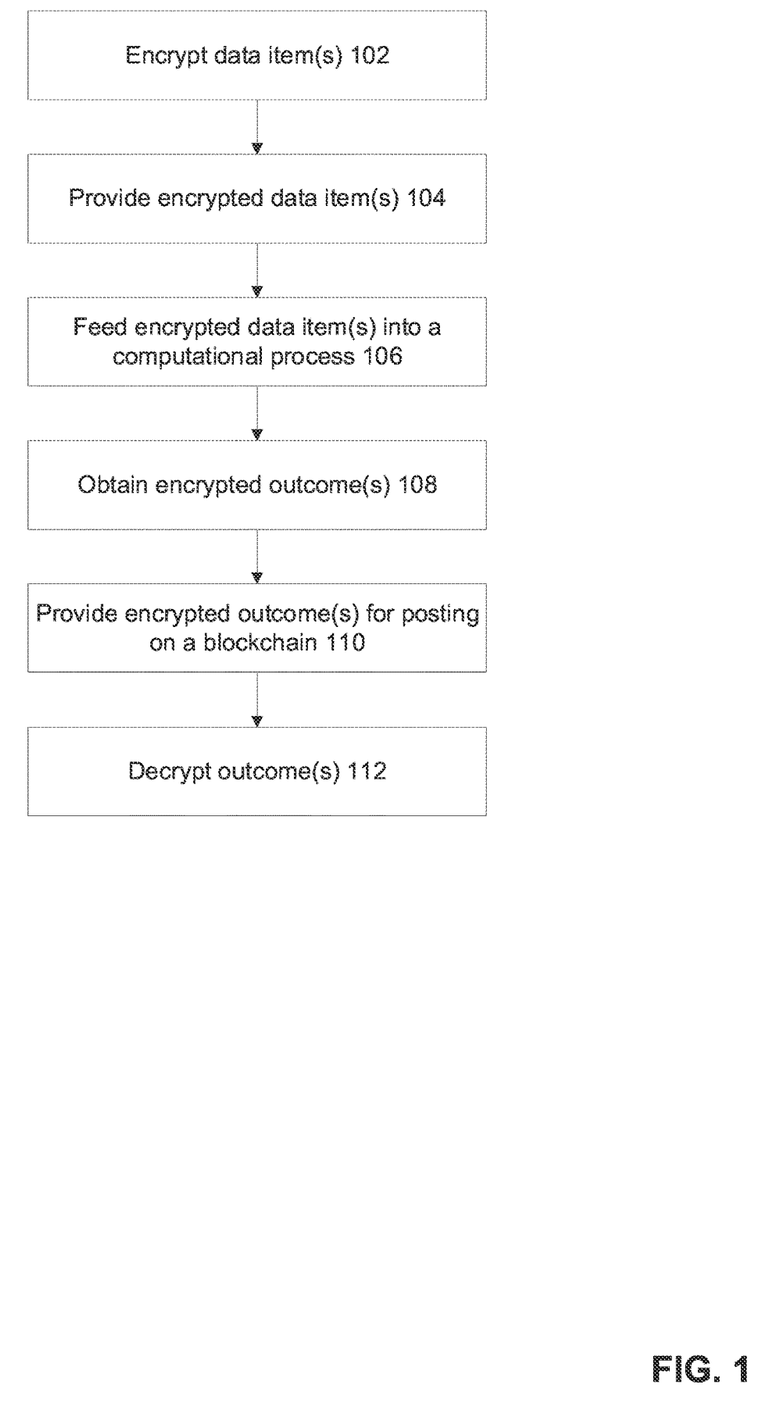
FIG. 1 is a flowchart of a method of performing off-blockchain homomorphic encrypted computations, and storing the encrypted results by a smart contract code on a blockchain dataset, in accordance with some embodiments of the present invention.
Figure 2:
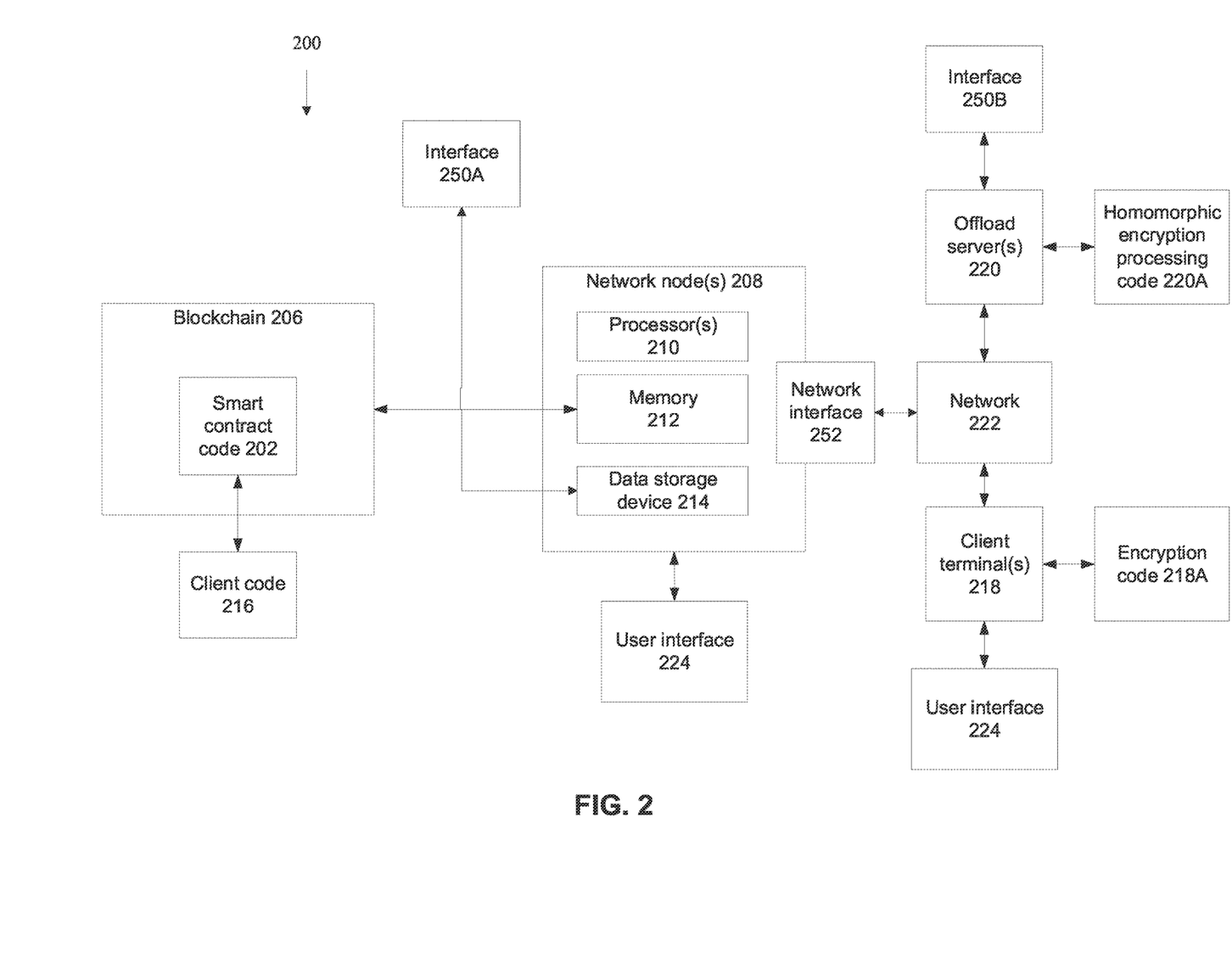
FIG. 2 is a block diagram of components of a system for performing off-blockchain homomorphic encrypted computations, and storing the encrypted result by a smart contract code on a blockchain dataset, in accordance with some embodiments of the present invention.
Figure 3:
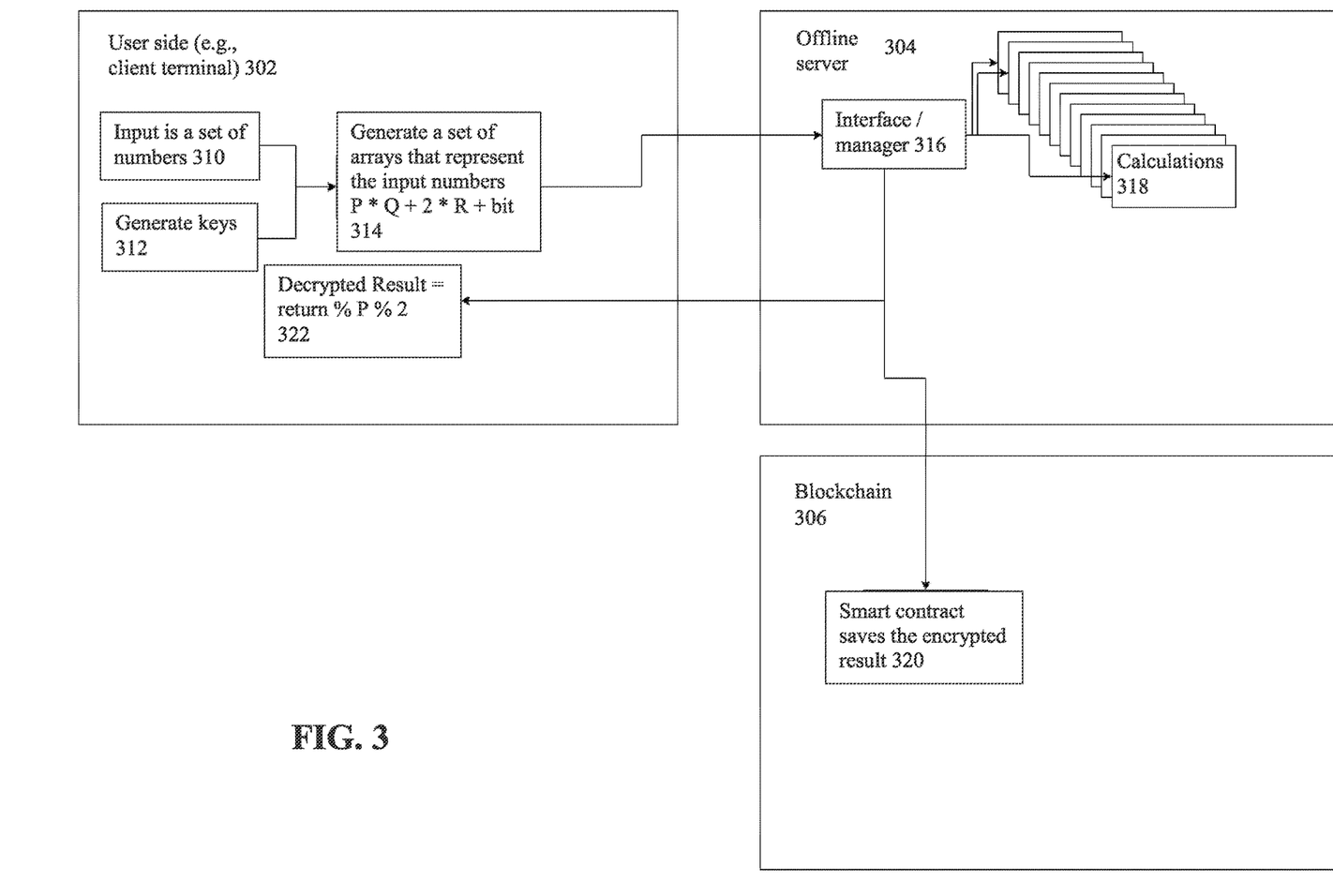
FIG. 3 is an example of performing off-blockchain homomorphic encrypted computations, and storing the encrypted results by a smart contract code on a blockchain dataset, in accordance with some embodiments of the present invention.

Reference is now made to FIG. 1, which is a flowchart of a method of performing off-blockchain homomorphic encrypted computations, and storing the encrypted results by a smart contract code on a blockchain dataset, in accordance with some embodiments of the present invention. Reference is also made to FIG. 2, which is a block diagram of components of a system 200 for performing off-blockchain homomorphic encrypted computations, and storing the encrypted result by a smart contract code 202 on a blockchain dataset 206, in accordance with some embodiments of the present invention. Reference is also made to FIG. 3, which is an example of performing off-blockchain homomorphic encrypted computations, and storing the encrypted results by a smart contract code on a blockchain dataset, in accordance with some embodiments of the present invention.

Components of system 200 described with reference to FIG. 2 may executed one or more features of the methods described with reference to FIG. 1 and/or FIG. 3. For example, different features described with reference to FIG. 1 may be performed by client terminal(s) 218, and/or offload server(s) 220, and/or network node(s) 208.

System 200 includes multiple network nodes 208 (one node 208 shown for clarity and simplicity). Nodes 208 may be geographically distributed. Exemplary nodes 208 include, for example, a server, a computing cloud, a virtual machine, a virtual server, a client terminal, a desk top computer, a kiosk, a mobile device, a Smartphone, a Tablet computer, a laptop computer, a wearable computer, augmented reality glasses, a glasses computer, and a watch computer.

Each node 208 includes one or more processors 210, for example, a central processing unit(s) (CPU), a graphics processing unit(s) (GPU), field programmable gate array(s) (FPGA), digital signal processor(s) (DSP), and application specific integrated circuit(s) (ASIC). Processor(s) 210 may include one or more processors (homogenous or heterogeneous), which may be arranged for parallel processing, as clusters and/or as one or more multi core processing units.

Each node 208 includes a memory 212 that stores code instructions executable by hardware processor(s) 210, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory stores smart contract code 202 that implements one or more features and/or acts of the method described with reference to FIG. 1 and/or FIG. 3 when executed by hardware processor(s) 210.

Node 208 includes a data storage device 214 for storing data, including a copy of blockchain 206 associated with smart contract function code 202. Data storage device 214 may be implemented as, for example, a memory, a local hard-drive, virtual storage, a removable storage unit, an optical disk, a storage device, and/or as a remote server and/or computing cloud (e.g., accessed using a network connection). It is noted that code may be loaded from data storage device 214 into memory 212 for execution by processor(s) 210.

An interface 250A may be stored on memory 212 and/or data storage device 214 of one or more nodes 208. Interface 250A may communication with client terminal(s) 218 and/or offload server(s) 220, for example, for obtaining homomorphic encrypted data (for performing computations) and/or for obtaining results of the computations applied on the homomorphic encrypted data. Interface 250A may be implemented as, for example, a software interface, a virtual interface, a physical interface, an application programming interfaced (API), software development kit (SDK), and the like.

An interface 250B may be stored on a memory and/or data storage device of one or more offload server(s) 220. Interface 250B may communication with client terminal(s) 218 and/or node(s) 208, for example, for obtaining homomorphic encrypted data (for performing computations) such as from client terminal(s) 218 and/or for providing results of the computations applied on the homomorphic encrypted data such as to node(s) 208. Interface 250B may be implemented as, for example, a software interface, a virtual interface, a physical interface, an application programming interfaced (API), software development kit (SDK), and the like.

Nodes 208 communicate over a network 222 with each other for updating their respective copies of blockchain 206.

Nodes 208 communicate with one or more client terminal 218 that may provide homomorphic encrypted data for processing by smart contract 202 and/or for reading results of smart contract 202 performing homomorphic computations on the homomorphic encrypted data.

Nodes 208 communicate with one or more offload servers 220 that perform computations on the homomorphic encrypted data (e.g., provided by client terminal 218), as described herein. Results of the computations by offload server(s) 220 may be stored on blockchain 206.

Network 222 may be implemented as, for example, the internet, a local area network, a virtual network, a wireless network, a cellular network, a local bus, a point to point link (e.g., wired), and/or combinations of the aforementioned.

Offload server(s) 220 and/or client terminal(s) 218 may be implemented as, for example, a server, a computing cloud, a virtual machine, a virtual server, a desktop computer, a kiosk, a mobile device, a Smartphone, a Tablet computer, a laptop computer, a wearable computer, augmented reality glasses, a glasses computer, and a watch computer.

Each of node(s) 208, client terminal(s) 218, and/or offload server(s) 220 may include a respective network interface 252 for connecting to network 222, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Client terminal 218 may include one or more processors for execution of encryption code 218A (e.g., stored on a memory), for example, public and/or private keys for homomorphic encryption and/or decryption of data, as described herein.

Offload server(s) 220 may include one or more processors for execution of homomorphic encryption processing code 220A (e.g., stored on a memory) that performs computations on homomorphic encrypted data to obtain homomorphic encrypted results which are stored on blockchain 206, as described herein.

Node(s) 208 and/or client terminal 218, and/or offload server(s) 220 include and/or be in communication with one or more physical user interfaces 224 that include a mechanism for a user to enter data and/or view data Exemplary user interfaces 224 include, for example, one or more of, a touchscreen, a display, gesture activation devices, a keyboard, a mouse, and voice activated software using speakers and microphone.

Referring now back to FIG. 1, at 102, one or more data items are encrypted.

Optionally, a client terminal encrypted the data items with a public key compliant with a homomorphic encryption mechanism. The homomorphic encryption mechanism enables processing of encrypted data items, such that decryption of the encrypted result after the processing is the same value as processing the unencrypted data items.

The client terminal may generate a pair including a private key and the public key, where the private key and the private key are compliant with the homomorphic encryption mechanism.

The data items may be values for which it is desired to provide the outcome in a public, immutable form, i.e., on a blockchain, but in an encrypted state so only selected entities are able to know what the unencrypted value is. For example, several patients need a certain medical resource that is limited (e.g., MRI scan, surgical procedure). The patients and their data is encrypted. The smart contract may rank the patients according to their data, by off-loading from the blockchain to the offload server. The ranked list is stored in an encrypted state on the blockchain, to indicate that the ranking was done in a fair manner (e.g., anybody can check if the ranking is correct) while keeping the real ranking a secret except to entities with the private key that can decrypt the data.

In another example, the data includes encrypted features for feeding to a machine learning model, for example, images, medical data, and the like. The machine learning model performs inference on the encrypted data off-chain on the offload server. The encrypted outcome of the inference by the machine learning model is stored on the blockchain.

In yet another example, the data includes conditional buy/sell orders that are encrypted and remain encrypted throughout.

At 104, the encrypted data item(s) are provided, for example, obtained from the client terminal. The encrypted data item(s) may be provided to the offload server, optionally via an interface of the smart contract. I.e., the smart contact offloads the encrypted data items to the offload server using L2 offloading.

At 106, the encrypted data item(s) is fed into a computational process that computationally processes the encrypted data item(s) with computations compliant with the homomorphic encryption mechanism. The computational process processes encrypted data, such that the intermediate values and/or the data being manipulated remains encrypted.

The computational process is executed by processor(s) of a network connected offload server that executes the computational process off the blockchain. The offload server is in network communication with network nodes hosting the blockchain and the smart contract.

The computational process may be offloaded from the blockchain and smart contract to the offload server by a layer 2 offloading process.

The encrypted data item(s) may be fed into multiple computational processes executed by multiple off-loading smart contracts, which may be executing on multiple off-loading servers. The multiple smart contracts may be used when individual smart contracts cannot handle the complexity of the required operations on the encrypted data.

The offload server may be immutable. For example, for an input array for which an element in the array is to be changed, the whole array needs to be copied to other array, where the element is changed to the new value during the copying. The immutable property is used for generation of the zero proof knowledge.

Due to the immutable nature of the offload server, and to limit computations (e.g., to prevent unsolvable problems from infinite execution), each single offload smart contact may be limited to a certain number of instructions. Multiple offloading smart contracts may be used rather than a single offload smart contact since we use the offload smart contract for mathematical purposes and Big Integers implemented as an array are used, and since the calculations are performed on the arrays.

Optionally, multiple offload smart contacts are created by creating a respective offloading smart contract for each different element in the calculation. A new connection is opened with only one function in each call.

At 108, one or more encrypted outcomes are obtained from the computational process. Since homomorphic encryption was used, the value of the encrypted outcome is the same as the value of the unencrypted data items having undergone a corresponding computational process.

When multiple off-loading smart contracts are used, wherein the encrypted outcome(s) is obtained as an aggregation of sub-outcomes obtained from the off-loading smart contracts.

The computational process may generate zero knowledge proof associated with the encrypted outcome(s). The zero knowledge proof indicates that the computations by the computational process used to obtain the results were actually performed.

At 110, the encrypted outcome(s) of the computational process are provided to the smart contract for posting on a blockchain. Storing the encrypted outcome(s) on the blockchain creates a public and immutable record, while security the data.

Optionally, the zero knowledge proof is provided to the smart contract for storing on the blockchain.

At 112, an entity (e.g., the client terminal, another client terminal) may access the blockchain to obtain the encrypted outcome. It is noted that any entity may access the blockchain to obtain the encrypted outcome, since the blockchain is designed to be publicly accessible.

Entities with the private key may decrypt the encrypted outcome with the private key to obtain one or more decrypted outcomes. The encrypted outcome is compliant with the homomorphic encryption mechanism and decrypted with the private key corresponding to the public key and compliant with the homomorphic encryption. The homomorphic encryption mechanism ensures that the value of the decrypted outcome is the same as the value of the unencrypted data item(s) being processed by a corresponding computational process.

Referring now back to FIG. 3, the features of the dataflow described with reference to FIG. 3 may correspond to, further include, and/or be substituted with, one or more features described with reference to FIG. 2. The dataflow is depicted between the following entities: a user side 302, optionally a client terminal for example client terminal 218 described with reference to FIG. 2; an offline server 304, for example, offload server 220 described with reference to FIG. 2; and a blockchain, for example, blockchain 206 described with reference to FIG. 2.

At 310, the client terminal accesses an input set of numbers, optionally two numbers. The goal is to check which of the two numbers is larger, such that an external party that is not privileged to the two numbers cannot know what the numbers are, or which one is larger.

The numbers may be turned into a binary sequence. For example, when the two numbers are 2 and 1, the numbers are converted into the binary sequences 1-0 and 0-1.

At 312, the client terminal accesses generated keys for encryption using a homomorphic encryption mechanism. The client terminal may generate the encryption keys. The private encryption key is denoted "P", for example, 1000000. For each binary number, two more numbers denoted "Q" and "R" are generated, such that $P \gg Q \gg R$.

For the example: The first number is [1, 0] for which Q equals [50012, 12312] and R equals [61, 7] P=1000000. The second number is [0, 1] for which Q equals [75124, 66666] and R equals [8, 25] P=1000000.

The example described with reference to FIG. 3 is based on the homomorphic encryption mechanism described with reference to Marten van Dijk et al., *Fully Homomorphic Encryption over the Integers*, Jun. 8, 2010, available from https://eprint(dot)iacr(dot)org/2009/616. It is noted that the encryption of Marten van Dijk et al is an example, and not necessarily limiting, as embodiments described herein are capable of operating with other homomorphic encryption mechanisms.

At 314, the client terminal computes a set of arrays that represent the input numbers in an encrypted form compliant with the homomorphic encryption mechanism. The set of arrays are represented as [P*Q+2*R+bit], where bit denote a bit for index and/or bit in the array.

For the example, the first number is represented as =[1000000*50012+2*61+1, 1000000*12312+2*7+0]. The second number is represented as =[1000000*75124+2*8+0, 66666*12312+2*25+1].

At 316, the client terminal sends the two encrypted arrays to an interface and/or manager of the offline server 304. The interface may be a L2 offloading interface.

At 318, the offline server performs calculations on the set of arrays to obtain an encrypted result. The calculations are performed on the encrypted data, and are compliant with the homomorphic encryption mechanism. For example, the server run a Boolean circuit on the bits in the numbers. Any Boolean circuit can be run where each AND operation turns into multiplication and each OR operation turn into PLUS.

The offline server may divide the calculation into multiple parts, where each part is a different section of a comparison process.

In the case where a normal multiplication on two very big integers cannot be performed (e.g., due to limitations of the server and/or computation process) as required by the homomorphic encryption mechanism, rather than using an array of numbers, an array of arrays that each array represent a number is used.

For example, for the input [5123, 8152] where the multiplier of the big integer is 83, the input is turned to [[5123%83, (5123//83) % 83, . . . ], . . . ].

At 320, the interface of the offline server sends the encrypted result to a smart contract of a blockchain. The smart contrast saves the encrypted result on the blockchain. It is noted that the encrypted result is very big.

At 322, the original client terminal (or another client terminal) with the private key accesses the encrypted result from the blockchain, and decrypts the result using the private key, where the result is represented as return % P % 2. It is noted that the value 2 is used since the computations were performed using Boolean circuits.

For example, when the encrypted result is 123123123123 and P is 777, the client terminal computes (123123123123% 777) % 2 to get the answer whether the first number is larger than the second number or not.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant homomorphic encryption processes will be developed and the scope of the term homomorphic encryption is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system of cryptography for securing data on a blockchain, comprising: at least one hardware processor executing a code for enabling uploading secured data to a blockchain, said code comprising code instructions for:
   obtaining at least one encrypted data item, encrypted with a public key compliant with a homomorphic encryption mechanism;
   feeding the at least one encrypted data item into a computational process that is executed by at least one processor of a network connected offload-server that executes the computational process off the blockchain, and is in network communication with network nodes hosting the blockchain and a smart contract, said computational process manipulates the at least one encrypted data item with computations compliant with the homomorphic encryption mechanism and provides at least one encrypted outcome;
   obtaining the at least one encrypted outcome of the computational process from the network connected offload-server; and
   providing said at least one encrypted outcome to said smart contract for posting on a blockchain, wherein the at least one encrypted outcome is compliant with the homomorphic encryption mechanism and decrypted with a private key corresponding to the public key, and
   wherein the at least one encrypted outcome is obtained as an aggregation of sub-outcomes obtained from the plurality of off-loading smart contracts.

2. The system of claim 1, wherein feeding the at least one encrypted data comprises feeding the at least one encrypted data into a plurality of computational processes executed by a plurality of off-loading smart contracts executing on a plurality of off-loading servers, wherein the at least one encrypted outcome is obtained as an aggregation of sub-outcomes obtained from the plurality of off-loading smart contracts.

3. The system of claim 1, further comprising code that when executed by a processor of a client terminal, causes the processor to:
   generate a pair including a private key and a public key, compliant with the homomorphic encryption mechanism;
   encrypt at least one data item with the public key to generate the at least one encrypted data item, and
   provide the at least one encrypted data item for feeding into the computational process.

4. The system of claim 3, further comprising code that when executed by a processor of a client terminal, causes the processor to:
   access the blockchain to obtain the at least one encrypted outcome; and
   decrypt the at least one encrypted outcome with the private key to obtain at least one decrypted outcome.

5. The system of claim 1, further comprising code for obtaining a zero knowledge proof from the computational process, and providing the zero knowledge proof to the smart contract for storing on the blockchain.

6. The system of claim 1, wherein the at least one encrypted data item is obtained from a client terminal.

7. A method of cryptography for securing data on a blockchain, comprising: using at least one hardware processor executing a code for enabling uploading secured data to a blockchain, said code comprising code instructions for:
   obtaining at least one encrypted data item, encrypted with a public key compliant with a homomorphic encryption mechanism; feeding the at least one encrypted data item into a computational process that is executed by at least one processor of a network connected offload-server that executes the computational process off the blockchain, and is in network communication with network nodes hosting the blockchain and a smart contract, said computational process manipulates the at least one encrypted data item with computations compliant with the homomorphic encryption mechanism and provides at least one encrypted outcome; obtaining the at least one encrypted outcome of the computational process from the network connected offload-server; and providing said at least one encrypted outcome toa-said smart contract for posting on a blockchain, wherein the at least one encrypted outcome is compliant with the homomorphic encryption mechanism and decrypted with a private key corresponding to the public key, and
   wherein the at least one encrypted outcome is obtained as an aggregation of sub-outcomes obtained from the plurality of off-loading smart contracts.

8. A non-transitory medium storing program instructions for securing data on a blockchain, which, when executed by at least one processor, cause the at least one processor to enable uploading secured data to a block chain, said program instructions comprising:
   program instructions to obtain at least one encrypted data item, encrypted with a public key compliant with a homomorphic encryption mechanism; program instructions to feed the at least one encrypted data item into a computational process that is executed by at least one processor of a network connected offload-server that executes the computational process off the blockchain, and is in network communication with network nodes hosting the blockchain and a smart contract, said computational process manipulates the at least one encrypted data item with computations compliant with the homomorphic encryption mechanism and provides at least one encrypted outcome; program instructions to obtain the at least one encrypted outcome of the computational process from the network connected offload-server; and program instructions to provide said at least one encrypted outcome to said smart contract for posting on a blockchain, wherein the at least one encrypted outcome is compliant with the homomorphic encryption mechanism and decrypted with a private key corresponding to the public key, and wherein the at least one encrypted outcome is obtained as an aggregation of sub-outcomes obtained from the plurality of off-loading smart contracts.

\* \* \* \* \*